US007773246B2

(12) United States Patent  (10) Patent No.: US 7,773,246 B2
Oh et al.  (45) Date of Patent: Aug. 10, 2010

(54) PRINTING SYSTEM AND IMAGE FORMING DEVICE FOR PRINTING ELECTRONIC DOCUMENT AND PRINTING METHOD THEREOF

(75) Inventors: Myoung-jin Oh, Suwon-si (KR); Young-ju Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1343 days.

(21) Appl. No.: 11/244,149

(22) Filed: Oct. 6, 2005

(65) Prior Publication Data

US 2006/0077457 A1  Apr. 13, 2006

(30) Foreign Application Priority Data

Oct. 8, 2004  (KR) ............ 10-2004-0080427

(51) Int. Cl.
G06F 3/12  (2006.01)
G06K 15/00  (2006.01)
(52) U.S. Cl. ............. 358/1.15; 358/1.13; 358/1.18; 358/1.2
(58) Field of Classification Search .......... 358/1.15, 358/1.13, 1.18, 1.1, 1.14, 1.2, 1.16, 1.17, 358/1.9, 407, 468, 404, 444; 347/2, 3, 5, 347/14, 23; 399/1, 8, 9
See application file for complete search history.

(56) References Cited

U.S. PATENT DOCUMENTS 6,748,471 B1 * 6/2004 Keeney et al. ............ 710/220

2003/0115326 A1 * 6/2003 Verma et al. ............ 709/225

FOREIGN PATENT DOCUMENTS

| JP | 2001-282637 | 10/2001 |
| JP | 2003-345579 | 12/2003 |
| KR | 10-2001-0077777 A | 8/2001 |
| KR | 10-2003-0029232 A | 4/2003 |
| KR | 10-2003-0050640 A | 6/2003 |

* cited by examiner

Primary Examiner—Dov Popovici
(74) Attorney, Agent, or Firm—Roylance, Abrams, Berdo & Goodman, L.L.P.

(57) ABSTRACT

A printing system and an image forming device are provided for printing an electronic document, and an electronic document printing method thereof. The printing system includes an electronic document providing server for providing an electronic document, and a host computer having a first interface for receiving the electronic document from the electronic document providing server, a driver for setting print options and generating printing data according to the set print options when an electronic document print function corresponding to the received electronic document is selected, and a second interface for transferring the generated printing data. The printing system further includes an image forming device for printing the received printing data according to the set print options based upon the electronic document print function. The user can print the electronic document with optimal print quality without having to change the print options of the driver and the image forming device.

17 Claims, 4 Drawing Sheets

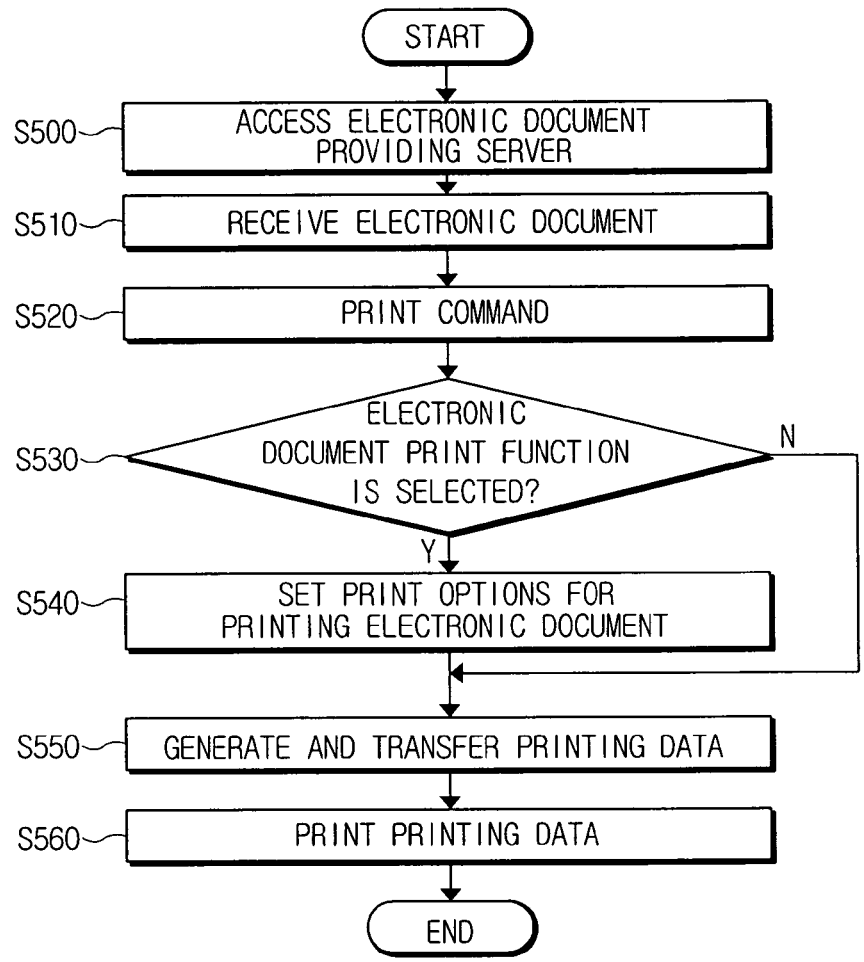
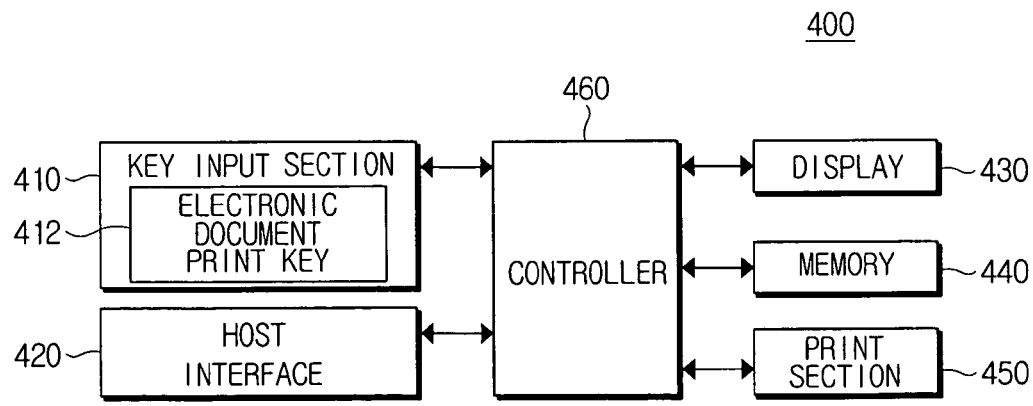

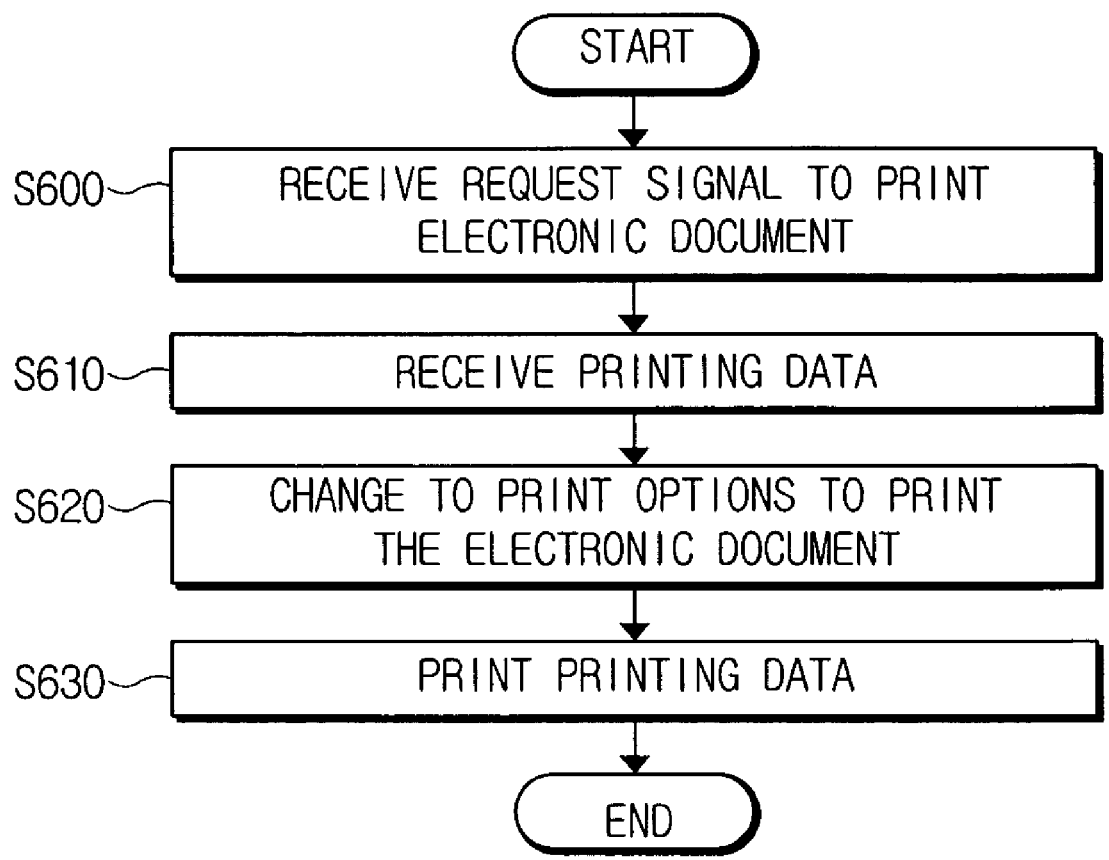

PRINTING SYSTEM AND IMAGE FORMING DEVICE FOR PRINTING ELECTRONIC DOCUMENT AND PRINTING METHOD THEREOF

CROSS-REFERENCE TO RELATED APPLICATIONS

This application claims the benefit under 35 U.S.C. §119(a) of Korean Patent Application No. 10-2004-0080427 filed in the Korean Intellectual Property Office on Oct. 8, 2004, the entire disclosure of which is incorporated herein by reference.

BACKGROUND OF THE INVENTION

1. Field of the Invention

The present invention relates to a printing system and an image forming device for printing a downloaded electronic document. More specifically, the present invention relates to a printing system and an image forming device for printing an electronic document that is downloaded via a network with an optimal print quality without regard to print options of a driver installed in a user terminal or those of the image forming device, and an electronic document printing method thereof.

2. Description of the Related Art

To obtain required certificates or civil affair documents issued from public institutions or private institutions, such as copies of resident registration, copies of family resident register, certificates of graduation, and transcripts of school records, users previously were required to visit the relevant institutions.

However, the prevalence of the Internet now enables users to obtain such certificates or documents downloaded via the Internet at home or in offices without having to visit the relevant institutions.

Specifically, the user accesses the home page of the relevant institution that issues the user's required certificates and documents via the Internet. The user selects a certificate or document to be issued, and the number of copies. The user may then pay a cost for issuing the certificate or document, for example, using an electronic payment system. After completing the payment, the certificate or document can then be printed by an image forming device such as a printer, connected to the user's terminal.

A conventional image forming device typically prints such certificates according to print options set at the previous printing operation. If the print options are set to default values, the certificate or document is printed normally. By contrast, if the print options are set to print multiple pages per sheet, or if set to a toner save mode, and/or a lowest resolution mode for example, the printed certificate or the document becomes useless even though the user has already paid for the copies.

As for the improperly printed copies, the user has to reset the print options to default values or select a suitable print mode, and repay the copy charges to the relevant institution to thus obtain the reissued certificate or document.

To address the above problematic aspects of the related art, the user may examine and change the print options of the driver before the printing operation. However, if the print options of the printer have priority to those of the driver, certificates or documents that are useless and unsuitable for the purposes of the user may still be printed due to the print options of the printer.

Accordingly, a need exists for a system and method for printing an electronic document downloaded via a network with an optimal print quality.

SUMMARY OF THE INVENTION

The present invention has been provided to substantially solve the above-mentioned and other problems occurring in the conventional arrangement and provide the following additional advantages. Accordingly, an aspect of the present invention is to provide a printing system and an image forming device for printing an electronic document downloaded via a network with an optimal print quality by providing an electronic document print function to a driver and the image forming device, and a method for printing the electronic document based upon the electronic document print function.

To achieve the above and other aspects of the present invention, a printing system for printing an electronic document is provided and comprises an electronic document providing server for providing an electronic document, and a host computer comprising a first interface for receiving the electronic document from the electronic document providing server, a driver for setting print options and generating printing data according to the set print options when an electronic document print function corresponding to the received electronic document is selected, and a second interface for transferring the generated printing data. The printing system further comprises an image forming device for printing the received printing data.

The driver may generate a print command to change a print setup of the image forming device to print options for the printing operation of the electronic document.

The print options may comprise at least one of a release of a toner save mode, a resolution change according to a specification of the image forming device, a number of copies, a type of printing paper, and print default values of the image forming device.

The printing system may further comprise a memory that stores information corresponding to the electronic document providing server.

The driver may set the print options for the printing operation of the electronic document when information of the electronic document providing server, which is received at the first interface, is the same as the information stored in the memory.

According to another aspect of the present invention, a printing method is provided for a printing system that comprises an electronic document providing server, a host computer, and an image forming device for printing an electronic document. The method comprises the steps of accessing at the host computer, the electronic document providing server via a network and receiving an electronic document. The method further comprises the steps of setting at the host computer, print options for the printing operation of the electronic document, and generating printing data according to the set print options when an electronic document print function is selected. The method still further comprises the steps of transferring the generated printing data to the image forming device and printing the received printing data at the image forming device.

The printing method may further comprise the step of generating a print command to change a print setup of the image forming device to print options for the printing operation of the electronic document.

The print options may comprise at least one of a release of a toner save mode, a resolution change according to a specification of the image forming device, a number of copies, a type of printing paper, and print default values of the image forming device.

According to another aspect of the present invention, an image forming device for printing an electronic document is provided and comprises a key input section for transferring at least one request signal including a request signal to print an electronic document, a host interface for receiving printing data from the host computer, a controller for changing a print setup to print options for the printing operation of the electronic document when the request signal to print the electronic document is received from the key input section, and a print section for printing the printing data according to the changed print options.

The image forming device may further comprise a display that displays the print options changed at the controller.

The print options may comprise at least one of a release of a toner save mode, a resolution change according to a specification of the image forming device, a number of copies, a type of printing paper, and print default values of the image forming device.

According to yet another aspect of the present invention, a printing method of an image forming device is provided for printing an electronic document, and comprises the steps of receiving a request signal to print an electronic document, receiving printing data from a host computer, changing a print setup to print options for the printing operation of the electronic document, and printing the received printing data according to the changed print options.

The printing method may further comprise the step of displaying the changed print options.

The print options may comprise at least one of a release of a toner save mode, a resolution change according to a specification of the image forming device, a number of copies, a type of printing paper, and print default values of the image forming device.

BRIEF DESCRIPTION OF THE DRAWING FIGURES

These and other aspects and advantages of the present invention will become apparent and more readily appreciated from the following description of exemplary embodiments, taken in conjunction with the accompanying drawing figures, of which:

FIG. 4 is a flowchart illustrating a printing method of a print system to print electronic documents according to an embodiment of the present invention;

FIG. 5 is a block diagram of an image forming device according to an embodiment of the present invention; and FIG. 6 is a flowchart illustrating a printing method of an image forming device according to an embodiment of the present invention.

Throughout the drawings, like reference numerals will be understood to refer to like parts, components and structures.

DETAILED DESCRIPTION OF THE EXEMPLARY EMBODIMENTS

Figure 1:
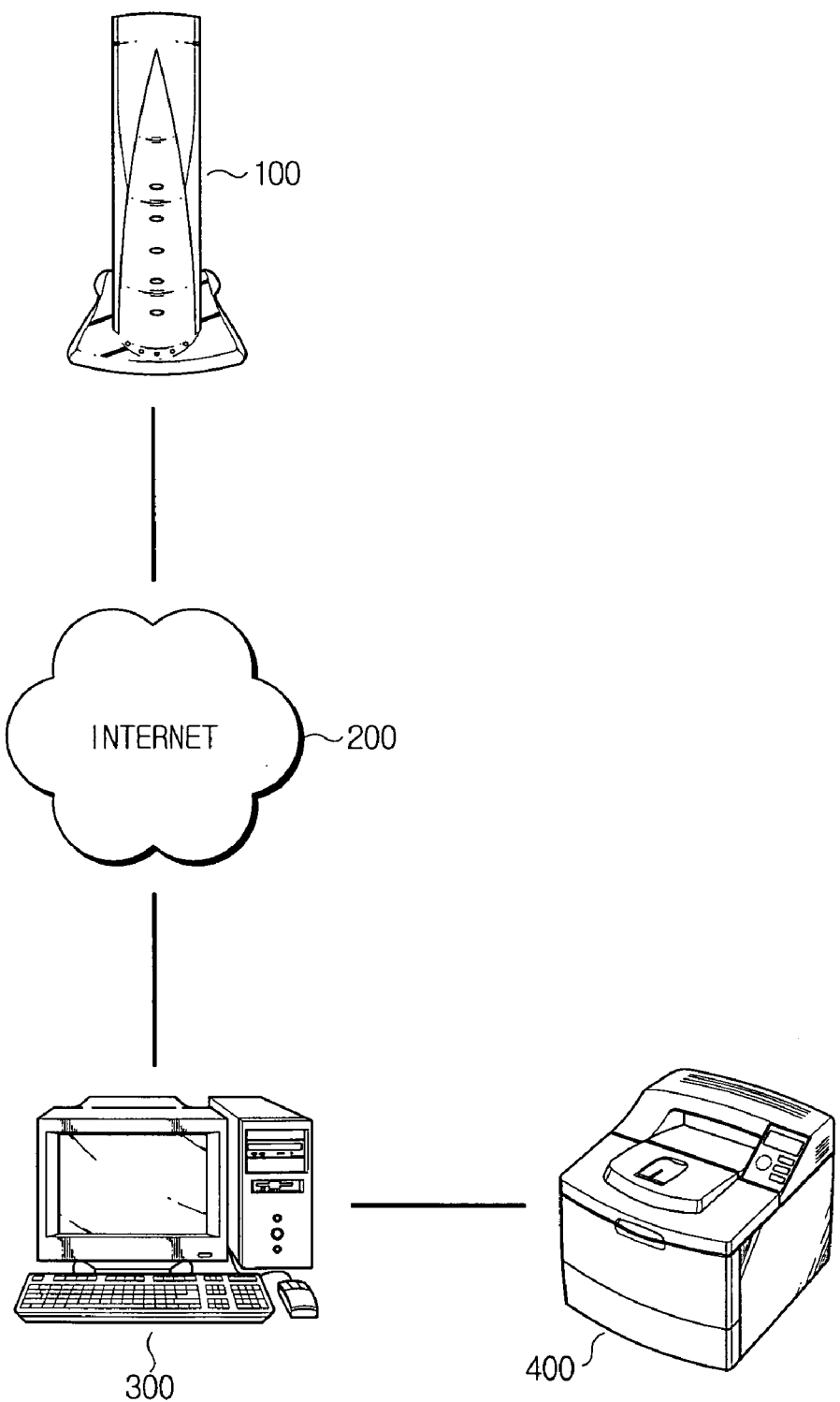
FIG. 1 is a conceptual diagram of a printing system according to an embodiment of the present invention.

Reference will now be made in detail to embodiments of the present invention, examples of which are illustrated in the accompanying drawings, wherein like reference numerals refer to like elements throughout. Exemplary embodiments are described below in order to explain the present invention by referring to the drawings.

FIG. 1 is a conceptual diagram of a printing system according to an embodiment of the present invention.

The printing system according to an embodiment of the present invention comprises an electronic document providing server 100, a host computer 300, and an image forming device 400.

The electronic document providing server 100 provides electronic documents to the host computer 300 via an Internet 200 through wired or wireless connections. The electronic documents include various certificates and other civil affair documents, that can be downloadable via the Internet 200 after paying for the copies. Typically, the electronic document providing server 100 is a server of a public or private institution in charge of civil affairs administration.

The host computer 300 requests the necessary or desired electronic documents by accessing the electronic document providing server 100 via the Internet 200, and receives the relevant electronic documents from the electronic document providing server 100. Users can select a type or number of documents from various electronic documents provided by the electronic document providing server 100 at the host computer 300.

The image forming device 400 is communicatively connected to the host computer 300, and prints the electronic documents issued from the providing electronic document providing server 100 to the host computer 300. According to an embodiment of the present invention, the issued electronic documents can be printed according print options of either a driver installed at the host computer 300 or at the image forming device 400.

Figure 2:
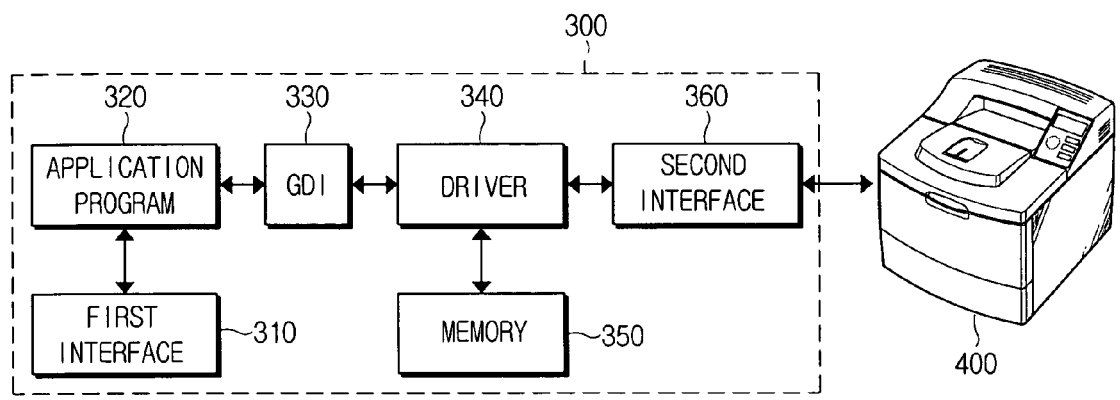
FIG. 2 is a block diagram of a host computer according to an embodiment of the present invention.
Figure 3:
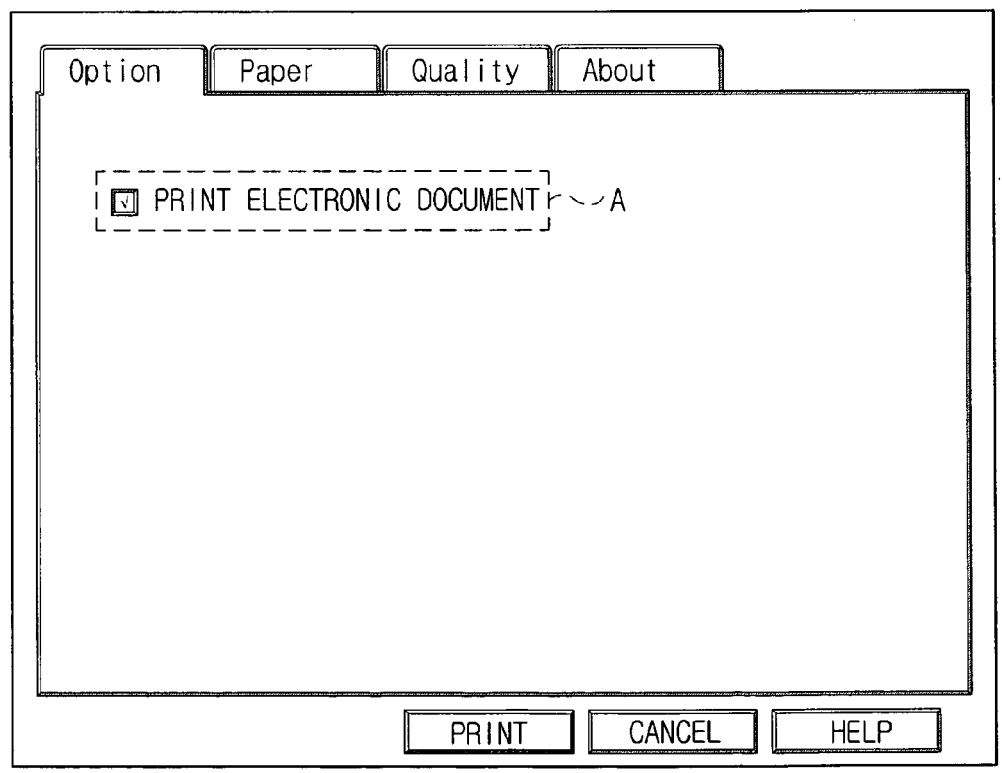
FIG. 3 is a view of a user interface provided from the host computer of FIG. 2 according to an embodiment of the present invention.

FIG. 2 is a block diagram of the host computer 300, and FIG. 3 is a view of a user interface provided by the host computer 300 of FIG. 2, according to an embodiment of the present invention.

The host computer 300 comprises a first interface 310, an application program 320, a graphic device interface (GDI) 330, a driver 340, a memory 350, and a second interface 360.

The first interface 310 accesses the electronic document providing server 100 over the Internet 200, and receives electronic documents that the user wants to print from the electronic document providing server 100.

The application program 320 forwards the electronic documents received through the first interface 310 to the driver 340 via the GDI 330.

The GDI 330 supports an interface between the application program 320 and the driver 340. Accordingly, the application program 320 preferably only processes the interfacing with the GDI 330.

The driver 340 converts a print command and the electronic documents, which are received via the application program 320 and the GDI 330, to data recognizable by the image forming device 400. The driver 340 outputs the converted data to the second interface 360.

The driver 340 further provides menus allowing the user to change the print options of the image forming device 400. For example, the driver 340 can provide a user interface comprising menus to set the print options such as a printing paper, resolution, and number of copies as shown in FIG. 3.

Referring to FIG. 3, the user interface provided by the driver 340 comprises a plurality of menus preferably in each of an Option tab, Paper tab, Quality tab, and an About tab. The Option tab, Paper tab, Quality tab, and About tab of FIG. 3 are presented as examples, and are not limited thereto. The Option tab comprises a 'print electronic document' menu A with a check box to enable the user to print the electronic documents.

If the 'print electronic document' menu A is selected, the driver 340 sets certain print options for the printing operation of the electronic document. The certain print options can comprise at least one of a release of a toner save mode, a resolution change according to the specification of the image forming device 400, a number of copies, a type of printing paper, and a default print setup of the image forming device 400.

Where the specification of the image forming device 400 describes a relatively low resolution, it is preferred to print the electronic documents at a maximum resolution. Conversely, where the specification of the image forming device 400 describes a relatively high resolution, it is preferred to print the electronic documents at a default resolution.

The driver 340 compares information relating to the electronic document providing server 100, which is received at the first interface 310 together with the electronic documents, with information stored in the memory 350.

If the information of the electronic document providing server 100 is the same as the information stored in the memory 350, the driver 340 sets the certain print options for the printing operation of the electronic document, even when the 'print electronic document' menu A is not selected.

If the information of the electronic document providing server 100 is different from the information stored in the memory 350, the driver 340 can direct the memory 350 to selectively store the information of the electronic document providing server 100.

The memory 350 stores information corresponding to the electronic document providing server 100. The information corresponding to the electronic document providing server 100 may comprise a domain and a title of the electronic document providing server 100.

The second interface 360 transfers the print command and the printing data output from the driver 340, to the image forming device 400. The second interface 360 can further receive and acquire operation state information from the image forming device 400.

FIG. 4 is a flowchart illustrating a printing method of a print system to print electronic documents according to an embodiment of the present invention.

The following illustrates an exemplary control method for the host computer 300 in reference to FIGS. 1 through 4.

The first interface 310 of the host computer 300 accesses the electronic document providing server 100 via the Internet 200. The user then selects through the host computer 300, at least one electronic document from among various electronic documents provided by the electronic document providing server 100 at step (S500).

Upon selecting the desired electronic document, the electronic document providing server 100 transmits the selected electronic document to the host computer 300 via the Internet 200. The host computer 300 then receives the electronic document at step (S510).

Upon receiving the electronic document through the first interface 310 of the host computer 300, the application program 320 issues a print command to the driver 340 via the GDI 330 at step (S520).

The driver 340, upon receiving the print command, provides the user with the user interface of FIG. 3. To use the electronic document print function, the user selects the 'print electronic document' menu A. The driver 340 then determines whether the electronic document print function is selected at step (S530).

If the electronic document print function is selected at step (S530), the driver 340 sets the print options for the printing operation of the electronic document at step (S540), and generates the printing data of the electronic document to be printed according to the set printing options. Next, the driver 340 transfers the generated printing data to the image forming device 400 through the second interface 360 at step (S550).

If the electronic document print function is not selected at step (S530), the driver 340 generates the printing data to print the electronic document according to other print options set at a previous printing operation. Next, the driver 340 transfers the generated printing data to the image forming device 400 through the second interface 360 at step (S550).

Thus, the image forming device 400 receives the printing data from the second interface 360 of the host computer 300, and prints the received printing data at step (S560).

FIG. 5 is a block diagram of the image forming device 400 according to an embodiment of the present invention.

The image forming device 400 comprises a key input section 410, a host interface 420, a display 430, a memory 440, a print section 450, and a controller 460.

The key input section 410 comprises a plurality of function keys, including an electronic document print key 412. The key input section 410 transfers at least one request signal corresponding to the plurality of the function keys to the controller 460. For example, the key input section 410 can transfer the request signal to print the electronic document upon the selection of the electronic document print key 412.

The host interface 420 receives the printing data from the host computer 300.

The display 430 displays the operation state of the image forming device 400 or displays a menu corresponding to the selected function key of the key input section 410 under the control of the controller 460. In addition, the display 430 displays the print options changed by the controller 460 to inform the user of the changed print options.

The memory 440 comprises a nonvolatile memory and a volatile memory. The nonvolatile memory contains control programs required to execute functions of the image forming device 400. The volatile memory temporarily stores data generated during the program execution at the controller 460.

The print section 450 prints the printing data under the control of the controller 460.

When the power is supplied to the image forming device 400, the controller 460 controls the operation of the image forming device 400 according to the control programs contained in the memory 440. When receiving the request signal to print the electronic document upon the selection of the electronic document print key 412 of the key input section 410, the controller 460 changes to the print options that are more suitable for the printing operation of the electronic document.

The print options for the electronic document, which are provided and used to change the print setup of the image forming device 400, can comprise at least one of a release of a toner save mode, a resolution change according to the specification of the image forming device 400, a number of copies, a type of printing paper, and print default values of the image forming device 400, substantially like the print options of the host computer 300 described above.

FIG. 6 is a flowchart illustrating a method of the image forming device 400 for printing an electronic document according to an embodiment of the present invention.

Hereinafter, an exemplary print method of the image forming device 400 is illustrated in reference to FIG. 1 through FIG. 6.

When the user manipulates the electronic document print key 412 of the key input section 410 to execute the electronic document print function, the request signal to print the electronic document is input from the key input section 410 to the controller 460 at step (S600). It is understood that the request signal to print the electronic document is input from the key input section 410 by way example, and is not limited thereto. For example, the request signal may also be input according to the print command transferred from the host computer 300.

The host computer interface 420 receives the printing data from the second interface 360 of the host computer 300 at step (S610). The printing data is comprised of the electronic document converted at the driver 340 of the host computer 300 to be recognizable by the image forming device 400.

The controller 460 then changes the print setup of the image forming device 400 to the print options for the printing operations of the electronic document so as to print the printing data according to the request signal to print the electronic document with the optimal print quality at step (S620).

Next, the controller 460 controls the print section 450 to print the printing data with the changed print options. The print section 450 then prints the printing data under the control of the controller 460 at step (S630).

As illustrated above, embodiments of the present invention provide the electronic document print function to both the driver and the image forming device. Accordingly, the user can print the optimal electronic document without having to change the print options one by one.

Furthermore, even if the print setup of the image forming device has priority to that of the driver, the optimal print quality can be maintained by changing the print setups of both the driver and the image forming device to the print options for the electronic document based upon the electronic document print function.

While the present invention has been particularly shown and described with reference to exemplary embodiments thereof, it will be understood by those skilled in the art that various changes in form and detail may be made therein without departing from the spirit and scope of the invention as defined by the appended claims.

What is claimed is:

1. A printing system for printing an electronic document, comprising:
    an electronic document providing server for providing an electronic document;
    a host computer comprising:
        a first interface for receiving the electronic document from the electronic document providing server;
        a driver for setting print options for printing operation of the electronic document when an electronic document print function corresponding to the received electronic document is selected, and generating printing data according to the set print options;
        a second interface for transferring the generated printing data; and
    an image forming device for printing the received printing data;
    a memory for storing information corresponding to the electronic document providing server;
    wherein the electronic document is one of a certificate and a civil affair document;
    wherein the driver is configured to set the print options for the printing operation of the electronic document when information of the electronic document providing server is received by the first interface; and
    wherein the driver is configured to set the print options for the printing operation of the electronic document when the information of the electronic document providing server is the same as the information stored in the memory.

2. The printing system according to claim 1, wherein the driver is configured to generate a print command to change a print setup of the image forming device to the set print options for the printing operation of the electronic document.

3. The printing system according to claim 1, wherein the print options comprise at least one of a release of a toner save mode, a resolution change according to a specification of the image forming device, a number of copies, a type of printing paper, and print default values of the image forming device.

4. The printing system according to claim 1, further comprising:
    a key input section for transferring a request signal to print the electronic document;
    a host interface for receiving the printing data from the host computer;
    a controller for changing a print setup to the set print options for the printing operation of the electronic document when the request signal to print the electronic document is received from the key input section; and
    a print section for printing the printing data according to the changed print options.

5. The printing system according to claim 4, further comprising a display for displaying the print options changed by the controller.

6. The printing system according to claim 4, wherein the print options comprise at least one of a release of a toner save mode, a resolution change according to a specification of the image forming device, a number of copies, a type of printing paper, and print default values of the image forming device.

7. A printing method for printing an electronic document of a printing system that comprises an electronic document providing server, a host computer, and an image forming device, comprising the steps of:
    accessing at the host computer the electronic document providing server via a network and receiving an electronic document;
    setting at the host computer print options for a printing operation of the electronic document when an electronic document print function is selected and generating printing data according to the set print options;
    transferring the generated printing data to the image forming device; and
    printing at the image forming device the received printing data;
    wherein the electronic document is one of a certificate and a civil affair document;
    wherein a driver is configured to set the print options for the printing operation of the electronic document when information of the electronic document providing server is received by an interface of the host computer; and
    wherein the driver is configured to set the print options for the printing operation of the electronic document when the information of the electronic document providing server is the same as the information stored in a memory for storing information corresponding to the electronic document providing server.

8. The printing method according to claim 7, further comprising the step of:
    generating a print command to change a print setup of the image forming device to the set print options for the printing operation of the electronic document.

9. The printing method according to claim 7, wherein the print options comprise at least one of a release of a toner save mode, a resolution change according to a specification of the image forming device, a number of copies, a type of printing paper, and print default values of the image forming device.

10. An image forming device for printing an electronic document, comprising:
- a key input section for transferring a request signal to print an electronic document;
- a host interface for receiving printing data from a host computer;
- a controller for changing a print setup to set print options for a printing operation of the electronic document according to the request signal when the request signal to print the electronic document is received from the key input section; and
- a print section for printing the printing data according to the changed print options;
- wherein at the host computer an electronic document providing server via a network is accessed and the electronic document is received;
- wherein the electronic document is one of a certificate and a civil affair document;
- wherein a driver is configured to set the print options for a printing operation of the electronic document when information of the electronic document providing server is received by a first interface of the host computer; and
- wherein the driver is configured to set the print options for the printing operation of the electronic document when the information of the electronic document providing server is the same as information stored in a memory, the memory for storing information corresponding to the electronic document providing server.

11. The image forming device according to claim 10, further comprising a display for displaying the print options changed at the controller.

12. The image forming device according to claim 10, wherein the print options comprise at least one of a release of a toner save mode, a resolution change according to a specification of the image forming device, a number of copies, a type of printing paper, and print default values of the image forming device.

13. A printing method of an image forming device for printing an electronic document, comprising the steps of:
- receiving a request signal to print an electronic document;
- receiving printing data from a host computer;
- changing a print setup to set print options for a printing operation of the electronic document according to the request signal to print the electronic document; and
- printing the received printing data according to the changed print options;
- wherein at the host computer an electronic document providing server via a network is accessed and the electronic document is received;
- wherein the electronic document is one of a certificate and a civil affair document;
- wherein a driver is configured to set the print options for the printing operation of the electronic document when information of the electronic document providing server is received by an interface; and
- wherein the driver is configured to set the print options for the printing operation of the electronic document when the information of the electronic document providing server is the same as information stored in a memory, the memory for storing information corresponding to the electronic document providing server.

14. The printing method according to claim 13, further comprising the step of displaying the changed print options.

15. The printing method according to claim 13, wherein the print options comprise at least one of a release of a toner save mode, a resolution change according to a specification of the image forming device, a number of copies, a type of printing paper, and print default values of the image forming device.

16. A computer-readable medium comprising executable instructions embodied on a computer-readable medium for printing an electronic document, comprising:
- a first set of instructions for receiving a request signal to print an electronic document;
- a second set of instructions for changing a print setup to set print options for a printing operation of the electronic document when printing data from a host computer is received; and
- a third set of instructions for printing the received printing data according to the changed print options;
- wherein at the host computer an electronic document providing server via a network is accessed and the electronic document is received;
- wherein the electronic document is one of a certificate and a civil affair document;
- wherein a driver is configured to set the print options for the printing operation of the electronic document when information of the electronic document providing server is received by an interface of the host computer; and
- wherein the driver is configured to set the print options for the printing operation of the electronic document when the information of the electronic document providing server is the same as information stored in a memory, the memory for storing information corresponding to the electronic document providing server.

17. The computer-readable medium comprising executable instructions embodied on a computer-readable medium according to claim 16, further comprising:
- a fourth set of instructions for displaying the changed print options, wherein the print options comprise at least one of a release of a toner save mode, a resolution change according to a specification of an image forming device, a number of copies, a type of printing paper, and print default values of the image forming device.

* * * * *